(12) United States Patent
Davidson

(10) Patent No.: US 11,437,818 B2
(45) Date of Patent: Sep. 6, 2022

(54) POWER SUPPLY APPARATUS FOR SUPPLYING POWER TO AN EXTERNAL ELECTRICAL LOAD IN HVDC POWER TRANSMISSION SYSTEMS

(71) Applicant: General Electric Technology GmbH, Baden (CH)

(72) Inventor: Colin Charnock Davidson, Stafford (GB)

(73) Assignee: General Electric Technology GmbH, Baden (CH)

( * ) Notice: Subject to any disclaimer, the term of this patent is extended or adjusted under 35 U.S.C. 154(b) by 24 days.

(21) Appl. No.: 16/063,168

(22) PCT Filed: Dec. 6, 2016

(86) PCT No.: PCT/EP2016/079950
§ 371 (c)(1),
(2) Date: Jun. 15, 2018

(87) PCT Pub. No.: WO2017/102462
PCT Pub. Date: Jun. 22, 2017

(65) Prior Publication Data
US 2018/0375330 A1 Dec. 27, 2018

(30) Foreign Application Priority Data
Dec. 17, 2015 (GB) ..................... 1522258

(51) Int. Cl.
*H02M 7/538* (2007.01)
*H02J 3/36* (2006.01)
(Continued)

(52) U.S. Cl.
CPC ............... *H02J 3/36* (2013.01); *H02J 3/005* (2013.01); *H02M 7/5387* (2013.01); *H02M 7/7575* (2013.01); *Y02E 60/60* (2013.01)

(58) Field of Classification Search
None
See application file for complete search history.

(56) References Cited

U.S. PATENT DOCUMENTS

2007/0029986 A1* 2/2007 Nakamura ............. B60L 58/12
323/318
2010/0133901 A1 6/2010 Zhang et al.
(Continued)

FOREIGN PATENT DOCUMENTS

EP    2 816 700 A1    12/2014
WO    2015/113604 A1   8/2015

OTHER PUBLICATIONS

Combined Search and Examination Report issued in connection with corresponding GB Application No. 1522258.1 dated May 18, 2016.

(Continued)

*Primary Examiner* — Jeffrey A Gblende
(74) *Attorney, Agent, or Firm* — Eversheds Sutherland (US) LLP

(57) ABSTRACT

There is provided a power supply apparatus for supplying power to an external electrical load, including a power transmission line or cable through which an alternating or direct current may flow, a power supply module, a control unit, an output terminal for connection to the external electrical load, and a converter. The power supply module includes an input terminal connected to the power transmission line or cable, and includes switching elements and energy storage device(s). The control unit controls the switching elements to selectively switch each energy storage device into circuit to direct a current flowing in the power transmission line or cable to flow through each energy storage device so as to store energy to form a power source.

(Continued)

The converter draws power from the power source and supplies the drawn power to the output terminal.

21 Claims, 3 Drawing Sheets

(51) Int. Cl.
*H02J 3/00* (2006.01)
*H02M 7/5387* (2007.01)
*H02M 7/757* (2006.01)

(56) References Cited

U.S. PATENT DOCUMENTS

| | | |
|---|---|---|
| 2010/0289443 A1 | 11/2010 | Mazumdar et al. |
| 2011/0089873 A1 | 4/2011 | Blocher et al. |
| 2011/0175579 A1 | 7/2011 | Mazumdar |
| 2012/0043816 A1 | 2/2012 | Pereira |
| 2014/0203645 A1 | 7/2014 | Leu et al. |
| 2014/0211528 A1 | 7/2014 | Inoue et al. |
| 2014/0313797 A1 | 10/2014 | Davidson et al. |
| 2015/0116881 A1 | 4/2015 | Burnett et al. |
| 2015/0131189 A1 | 5/2015 | Davidson et al. |
| 2015/0280591 A1* | 10/2015 | Handa ............... H02M 1/08 363/21.04 |
| 2016/0322824 A1* | 11/2016 | Park ................ H02M 5/4585 |

OTHER PUBLICATIONS

International Search Report and Written Opinion issued in connection with corresponding PCT Application No. PCT/EP2016/079950 dated Jan. 26, 2017.

International Preliminary Report on Patentability issued in connection with corresponding PCT Application No. PCT/EP2016/079950 dated Jun. 19, 2018.

* cited by examiner

POWER SUPPLY APPARATUS FOR SUPPLYING POWER TO AN EXTERNAL ELECTRICAL LOAD IN HVDC POWER TRANSMISSION SYSTEMS

FIELD OF INVENTION

This invention relates to a power supply apparatus and to an electrical assembly comprising such a power supply apparatus, in particular for use in HVDC power transmission systems.

BACKGROUND OF THE INVENTION

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance. Such a power transmission network is referred to as a high voltage, direct current (HVDC) power transmission system.

SUMMARY

According to a first aspect of the invention, there is provided a power supply apparatus for supplying power to an external electrical load, the power supply apparatus including:
  a power transmission line or cable through which an alternating or direct current may flow;
  a power supply module including an input terminal connected to the power transmission line or cable so that the power supply module is connected in series with the power transmission line or cable, the power supply module including a plurality of switching elements and at least one energy storage device, the or each energy storage device configured to be capable of storing energy to provide a voltage thereacross and releasing energy, the plurality of switching elements being arranged to permit switching of the or each energy storage device into and out of circuit with the input terminal;
  a control unit programmed to control the plurality of switching elements to selectively switch the or each energy storage device into circuit with the input terminal to direct a current flowing in the power transmission line or cable to flow through the or each energy storage device so as to store energy in the or each energy storage device to form a power source;
  an output terminal for connection to the external electrical load; and
  a converter connected to the power supply module to operably couple the or each energy storage device to the output terminal, the converter configured to draw power from the power source and supply the drawn power to the output terminal.

The configuration of the power supply apparatus of the invention allows energy to be harvested from the power transmission line or cable for storage in the or each energy storage device, thus enabling the or each energy storage device to form the power source. Meanwhile the control unit controls the plurality of switching elements to control the duration of the connection of the or each energy storage device into circuit with the input terminal and thereby control the amount of energy stored in the or each energy storage device. In turn, the power source is employed to supply power, via the converter, to an external electrical load connected, in use, to the output terminal.

In addition the configuration of the power supply apparatus of the invention provides a measure of control over the power supplied to the external load not only due to the use of the or each energy storage device as an intermediate energy store but also due to the use of the converter whose ratings can be configured to be compatible with the ratings of the electrical load. In contrast it can be difficult and unsafe to directly supply power from the power transmission line or cable to the electrical load, especially if the ratings of the electrical load is incompatible with the ratings of the power transmission line or cable.

The capability of the power supply apparatus to form the power source by drawing current from the power transmission line or cable enables the power supply apparatus to be employed in any location with a power transmission line or cable. This allows the power supply apparatus to supply power to any electrical load located in the vicinity of the power transmission line or cable, in particular any electrical load located in a remote location such as a power supply configured to power at least one component of a ground electrode station. In addition, by employing an existing power transmission line or cable that is configured to concurrently perform its normal power transmission function, the configuration of the power supply apparatus not only provides savings in terms of size, footprint and costs but also ensures a reliable supply of power to the electrical load.

An alternative to the invention is the use of a secondary cable, which runs alongside the power transmission line or cable, to supply power to an electrical load. Such use of the secondary cable however represents a large and expensive addition to the associated power transmission scheme, since the secondary cable would have to be comparable in length to the power transmission line or cable which may extend over hundreds or thousands of kilometres.

Another alternative to the invention is the use of a combination of batteries and a diesel generator to supply power to the electrical load. However, such use has its drawbacks. Firstly, the amount of diesel fuel that can be stored is finite, thus running the risk of the supply of power being cut short unexpectedly, and can present a significant fire risk when stored in large volumes, thus increasing the cost of associated safety measures and insurance premiums. Secondly the diesel generator is bulky and heavy, thus adding size and weight to the associated power system.

In embodiments of the invention, the plurality of switching elements may be arranged to be switchable to form a current path in the power supply module to direct a current flowing in the power transmission line or cable to bypass the or each energy storage device.

The converter provides a reliable means of drawing power from the power source and supplying power to the output terminal.

In addition the converter may be configured to perform a suitable conversion operation in order to provide a desired power to the output terminal.

For example, the or each energy storage device may be configured to be capable of storing energy to provide a DC voltage thereacross, and the converter may be or may include a DC-DC converter, a single-phase inverter or a multi-phase inverter. The DC-DC converter permits the conversion of DC power in order to supply DC power to the output terminal in cases where the electrical load requires a supply of DC power. The inverter permits the conversion of DC power in order to supply AC power to the output terminal in cases where the electrical load requires a supply of AC power.

In embodiments employing the use of a converter, the converter may be configured to regulate the power supplied to the output terminal so as to maintain the voltage across the or each energy storage device within a target range. This is because, since the amount of power available is limited by the amount of current flowing in the power transmission line or cable, it is desirable to prevent a mismatch between the power drawn from the power transmission line or cable and the power supplied to the electrical load in order to prevent an unwanted drop in the voltage across the or each energy storage device and thereby maintain the reliability of the power supply apparatus in supplying power to the electrical load.

Such regulation of the power supplied to the output terminal may be performed through, for example, the configuration of the converter to regulate the magnitude and/or frequency of its output voltage and/or regulate its output current to regulate the power supplied to the output terminal so as to maintain the voltage across the or each energy storage device within a target range.

Additionally the control unit may be programmed to control the plurality of switching elements to control the switching of the or each energy storage device into and out of circuit with the input terminal to regulate the storing of energy in the or each energy storage device so as to maintain the voltage across the or each energy storage device within a target range. This ensures that a desired amount of energy is stored in the or each energy storage device in order to obtain a desired voltage across the or each energy storage device and thereby maintain the reliability of the power supply apparatus in supplying power to the electrical load.

The current flowing in the power transmission line or cable may be unidirectional or bidirectional in the case of a DC power transmission line or cable, or may be bidirectional in the case of an AC power transmission line or cable. It will be understood that a unidirectional current flows in the power transmission line or cable in only one direction, and that a bidirectional current flows in the power transmission line or cable in one direction at a given time and in the opposite direction at a different time, i.e. the flow of the bidirectional current in the power transmission line or cable in both directions does not occur at the same time.

To accommodate the direction of the current flowing in the power transmission line or cable, the plurality of switching elements may be arranged to be switchable to direct a unidirectional or bidirectional current flowing in the power transmission line or cable to flow in a unidirectional direction through the or each energy storage device when the or each energy storage device is switched into circuit with the input terminal.

In an embodiment of the invention, the control unit may be a local, autonomous control unit. This allows the control unit to control the plurality of switching elements without requiring commands from a different control unit, such as a global controller, and thereby not only improves the response time of the power supply apparatus when it comes to supplying power but also obviates the need for a communications link between the control unit and the different control unit. In addition there is no need to provide a power supply for the different control unit, at least part of which would need to be installed at the same location as the control unit of the power supply apparatus of the invention. Furthermore the provision of a local, autonomous control unit in the power supply apparatus of the invention makes it easier to install the power supply apparatus in a remote location.

Optionally the control unit may be configured to be powered by the power source. This obviates the need to use a separate power source, such as a battery, to power the control unit, which would otherwise not only add size, weight and cost but also reduce the reliability of the control unit due to the risk of the separate power source failing.

The plurality of switching elements and the or each energy storage device may be arranged in the power supply module in different ways, non-limiting examples of which are described as follows.

In a first example, the power supply module may be configured so that the plurality of switching elements includes a pair of switching elements and the pair of switching elements are connected in parallel with the or each energy storage device in a half-bridge arrangement to define a 2-quadrant unipolar module that can provide zero or positive voltages and can conduct current in two directions.

In a second example, the power supply module may be configured so that the plurality of switching elements includes two pairs of switching elements and the pairs of switching elements are connected in parallel with the or each energy storage device in a full-bridge arrangement to define a 4-quadrant bipolar module that can provide negative, zero or positive voltages and can conduct current in two directions.

Each switching element may include an active switching device and/or a passive current check device. When a given switching element includes both the active switching device and passive current check device, the active switching device may be connected in anti-parallel with the passive current check device.

In a third example, the power supply module may be configured so that the plurality of switching elements includes first and second sets of series-connected current flow control elements connected in parallel with the or each energy storage device in a full-bridge arrangement to define a 2-quadrant or 4-quadrant bipolar rationalised module that can provide negative, zero or positive voltages and can conduct current in two directions or only one direction. Each set of current flow control elements includes a series connection of an active switching device and a passive current check device arranged to selectively direct current through the or each energy storage device.

In still further embodiments of the invention, the power supply apparatus may further include a cooling system powered by the power source. This obviates the need for a separate power source to power the cooling system.

According to a second aspect of the invention, there is provided an electrical assembly comprising: an electrical load; and a power supply apparatus according to the first aspect of the invention or any one of its embodiments, wherein the electrical load is connected to the output terminal of the power supply apparatus to permit the power supply apparatus to supply power to the electrical load.

The electrical load may be, but is not limited to, a power supply configured to power at least one component of a ground electrode station or a further converter, optionally wherein the further converter is an offshore converter. As indicated above, the configuration of the power supply apparatus of the invention renders it useful to supply power to such exemplary electrical loads.

When the electrical load is a power supply configured to power at least one component of the further converter, the control unit of the power supply apparatus may be configured to supply power to the electrical load during a start-up of the further converter.

The electrical assembly, in which the electrical load is a power supply configured to power at least one component of a further converter, may come in different forms.

In an exemplary form, the electrical assembly may include:
- first and second primary converters;
- a pair of DC power transmission links extending between and interconnecting DC sides of the first and second primary converters; and
- a first auxiliary device in the form of the power supply apparatus, the first auxiliary device operably connected between the DC sides of the first and second primary converters such that the power transmission line or cable of the power supply apparatus extends between and interconnects the DC sides of the first and second primary converters,
- wherein the electrical load is a power supply configured to power at least one component of the first primary converter, and one of the pair of DC power transmission links is the power transmission line or cable of the power supply apparatus.

During an outage of the foregoing exemplary electrical assembly, the power supply apparatus may be employed as a power supply to power the first primary converter during start-up. Such employment of the power supply apparatus is particularly advantageous when the first primary converter is an offshore converter.

In order to use the power supply apparatus to power the first primary converter, at least one of the primary converters may be configured to selectively drive a current to flow in a freewheeling current path that includes the DC power transmission links and the power supply module. More specifically, the at least one of the primary converters may be configured to insert a voltage into the freewheeling current path so as to selectively drive the current to flow in the freewheeling current path by reversing the relative polarity between the pair of DC power transmission links or by reversing the direction of the current flowing in the pair of DC power transmission links.

This allows energy to be harvested from the driven current in the power transmission line or cable for storage in the or each energy storage device so that the stored power can be subsequently supplied to the first primary converter.

Additionally or alternatively, in order to use the power supply apparatus to power the first primary converter, the electrical assembly may further include a second auxiliary device connected between the DC sides of the first and second primary converters such that the second auxiliary device is operably connected to one of the DC power transmission links.

The second auxiliary device may be configured to selectively drive a current to flow in a freewheeling current path that includes the DC power transmission links and the power supply module. More specifically, the second auxiliary device may be configured to insert a voltage into the freewheeling current path so as to selectively drive the current to flow in the freewheeling current path by reversing the relative polarity between the pair of DC power transmission links or by reversing the direction of the current flowing in the pair of DC power transmission links.

The second auxiliary device may be an auxiliary converter for connection to an electrical source. Optionally the auxiliary converter may be a rectifier.

The freewheeling current path may further include one of the primary converters. For example, the driven current in the freewheeling current path may flow into the primary converter, through the diodes in the valves of the converter, and out of the primary converter.

The electrical assembly may further include a primary bypass current path connected between the pair of DC power transmission links, the primary bypass current path including a circuit interruption device operable to selectively open and close the primary bypass current path, the freewheeling current path including the primary bypass current path in its closed state. Thus, the primary bypass current path can be readily closed when the freewheeling current path is required, and readily opened when the first and second primary converters are required to carry out their normal power transmission operation.

In an embodiment of the invention, the primary bypass current path may be connected in parallel with either the first or second primary converter.

The electrical assembly may further include a or a respective secondary bypass current path connected across the or each auxiliary device, the or each secondary bypass current path including a circuit interruption device operable to selectively open and close the secondary bypass current path. This allows the or each auxiliary device to be bypassed when the first and second primary converters are required to carry out their normal power transmission operation.

The first primary converter may be in the form of a diode rectifier. In such embodiments the configuration of the power supply apparatus of the invention provides a reliable means for supplying power to a power supply configured to power at least one component of the diode rectifier, even after start-up. The or each component of the diode rectifier may be, for example, in the form of a cooling system, a protection system or a monitoring system.

In embodiments of the invention the electrical assembly may include a plurality of power supply apparatuses, each power supply apparatus in accordance with the first aspect of the invention or any one of its embodiments. In such embodiments, the output terminal of each power supply apparatus may be connected to a respective terminal of the electrical load. This provides redundancy to improve the reliability of the electrical assembly as a whole.

It will be appreciated that the use of the terms "first" and "second", "primary", "secondary" and "auxiliary", and the like in the patent specification is merely intended to help distinguish between similar features (e.g. the first and second primary converters), and is not intended to indicate the relative importance of one feature over another feature.

BRIEF DESCRIPTION OF THE DRAWINGS

In embodiments of the invention will now be described, by way of non-limiting examples, with reference to the accompanying drawings in which.

DETAILED DESCRIPTION

Figure 1:
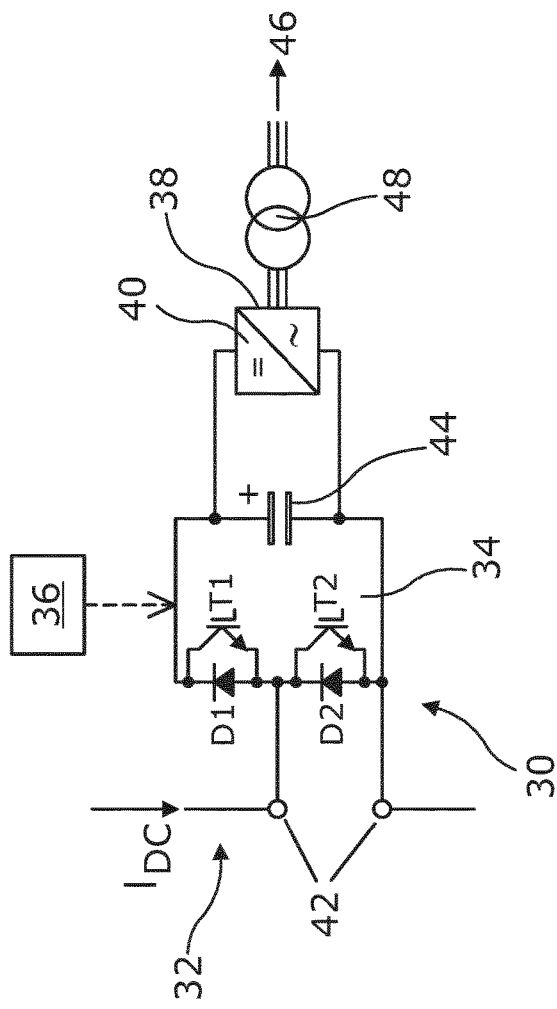
FIG. 1 shows schematically a power supply apparatus according to a first embodiment of the invention.

A power supply apparatus according to a first embodiment of the invention is shown In FIG. 1 and is designated generally by the reference numeral 30.

The power supply apparatus 30 is for supplying power to an external electrical load 46, such as a power supply configured to power at least one component of a ground electrode station or an offshore converter.

The power supply apparatus 30 comprises a DC power transmission line 32, a power supply module 34, a control unit 36, a cooling system (not shown), output terminals 38, and a converter.

In use, a direct current flows through the DC power transmission line 32.

The power supply module 34 includes a pair of input terminals 42 to connect the power supply module 34 in series with the DC power transmission line 32. The power supply module 34 includes a pair of switching elements in the form of IGBT-diode pairs, the diode D1, D2 being connected in anti-parallel with the IGBT T1, T2 in each IGBT-diode pair, and further includes an energy storage device 44 in the form of a capacitor.

The pair of switching elements are connected in parallel with the energy storage device 44 in a half-bridge arrangement between the input terminals 42 to define a 2-quadrant unipolar module that can provide zero or positive voltages and can conduct current in two directions.

The arrangement of the switching elements and energy storage device 44 in the power supply module 34 permits the switching of the energy storage device 44 into and out of circuit with the input terminal. More particularly, the pair of switching elements are switchable to form a current path in the power supply module 34 to direct the current flowing in the DC power transmission line 32 to flow through the energy storage device 44 so as to store energy in the energy storage device 44 or to bypass the energy storage device 44 when energy storage is not required.

When energy is stored in the energy storage device 44, a DC voltage is provided across the energy storage device 44. In this manner the energy storage device 44 forms a power source.

The control unit 36 is a local, autonomous control unit 36 that is configured to be powered by the power source. The control unit 36 is programmed to control the switching elements, in particular to selectively switch the energy storage device 44 into circuit with the input terminals 42 to direct the current flowing in the DC power transmission line 32 to flow through the energy storage device 44.

The cooling system is arranged to cool the components of the power supply apparatus 30, and is also configured to be powered by the power source.

In use, the output terminals 38 are connected to the external electrical load 46 via a transformer 48. The transformer 48 may be omitted in other embodiments.

The converter is in the form of an autonomous inverter 40 (which can be single-phase or multi-phase). The DC side of the inverter 40 is directly coupled to the terminals of the energy storage device 44, while the AC side of the inverter 40 is coupled to the output terminals 38. The inverter 40 is powered by the power source.

In the case where no current flows in the DC power transmission line 32, no energy is stored in the energy storage device 44, and the control unit 36 and cooling system are powered down.

When the direct current starts to flow in the DC power transmission line 32, the current is directed by the IGBT-diode pairs such that it flows through the energy storage device 44. This allows the power supply module 34 to harvest energy from the DC power transmission line 32 for storage in the energy storage device 44. In the power supply module 34, the energy storage device 44 will only charge up in one direction of current. As described above, the storage of energy in the energy storage device 44 results in the formation of the power source. When the voltage across the energy storage device 44 reaches a certain threshold, the control unit 36 and cooling system start to wake up upon receiving sufficient power from the power source.

The inverter 40 draws DC power from the power source, performs an AC-DC power conversion, and supplies AC power to the output terminals 38. In this manner the power source is employed to supply power, via the inverter 40, to the external electrical load 46 connected, in use, to the output terminals 38.

In other embodiments it is envisaged that the inverter 40 may be replaced by a DC-DC converter. This allows the power supply apparatus 30 to supply DC power to the output terminals 38.

Figure 2:
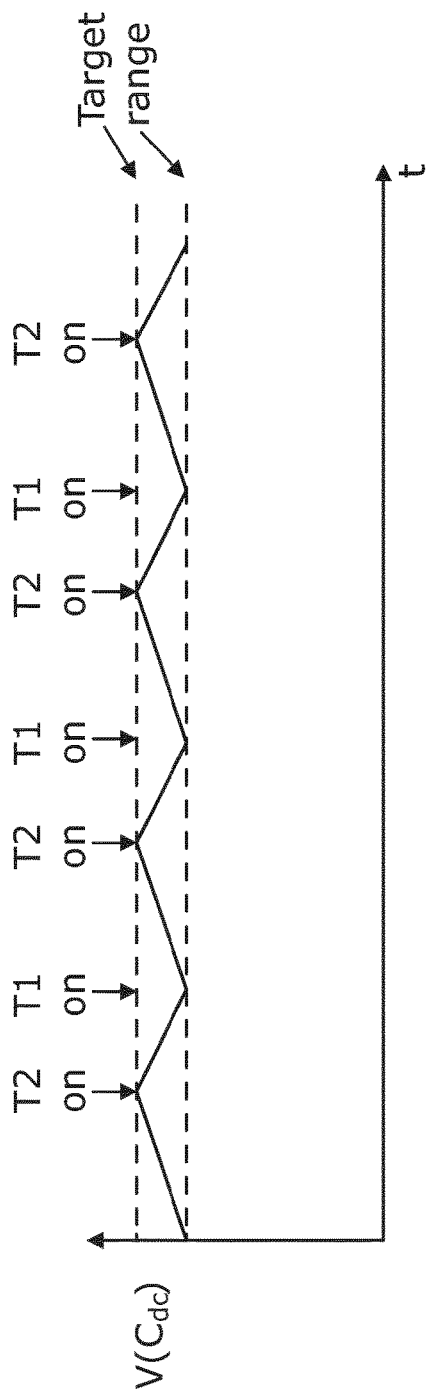
FIG. 2 illustrates graphically a hysteresis control of a voltage regulation operation of the power supply apparatus of FIG. 1.

FIG. 2 illustrates graphically a hysteresis control of a voltage regulation operation of the power supply apparatus 30 of FIG. 1.

During the storage of energy in the energy storage device 44, the DC voltage across the energy storage device 44 may reach its upper or lower limit. The upper limit may be reached when the power fed into the power supply module 34 exceeds the power drawn by the inverter 40 from the energy storage device 44. The lower limit may be reached when the power fed into the power supply module 34 is less than the power drawn by the inverter 40 from the energy storage device 44.

The control unit 36 may be employed to autonomously turn the IGBTs T1, T2 on and off according to a duty ratio to act as a chopper in order to control the duration during which the energy storage device 44 is connected into circuit with the input terminals 42 and thereby control the amount of energy stored in the energy storage device 44. This permits the control of the DC voltage across the energy storage device 44 within a target range.

The duty ratio in this case refers to the ratio between the duration of the energy storage device 44 being switched into circuit with the input terminals 42 (i.e. a connected state) and the duration of the energy storage device 44 being switched out of circuit with the input terminals 42 (i.e. a bypass state).

For optimal operation of the power supply apparatus 30, the power fed into the power supply module 34 should equal, on average, the power drawn by the inverter 44. The duty ratio between the bypass and connected states is determined by the ratio between the power drawn by the inverter 40 from the energy storage device 44 and the power available from the DC power transmission line 32, which is equal to the DC power transmission line current Inc multiplied by the voltage across the energy storage device 44. In some cases the power drawn by the inverter 40 may be lower from the power fed into the power supply module 34 by several orders of magnitude such that the duration corresponding to the connected state is much lower than the duration corresponding to the bypass state.

Hence the duty ratio can be altered to adjust the amount of power that can be derived from the energy storage device 44.

It will be appreciated that, if there is a need to export power back from the energy storage device 44 into the input terminals 42, the control unit 36 may be employed to control the switching elements to control the DC voltage across the energy storage device 44 by turning the IGBT T1 on and off. In this case it is not necessary to switch the other IGBT T2.

It will also be appreciated that the cooling system can be powered by the power source via the output terminals.

Since the amount of power available is limited by the amount of current flowing in the power transmission line or cable, it is desirable to prevent a mismatch between the power drawn by the inverter 40 from the energy storage device 44 and the power fed into the power supply module 34 in order to prevent an unwanted drop in the voltage across the energy storage device 44.

To prevent the aforementioned mismatch, the inverter 40 may be configured to regulate the power supplied to the output terminals so as to maintain the voltage across the energy storage device 44 within a target operating range by:
  when the DC voltage across the energy storage device 44 falls below the minimum of a target operating range, progressively limiting the output alternating current of the inverter 40;
  when the DC voltage across the energy storage device 44 falls below the minimum of a target operating range, progressively reducing the magnitude and/or frequency of the output AC voltage of the inverter 40.

Figure 3:
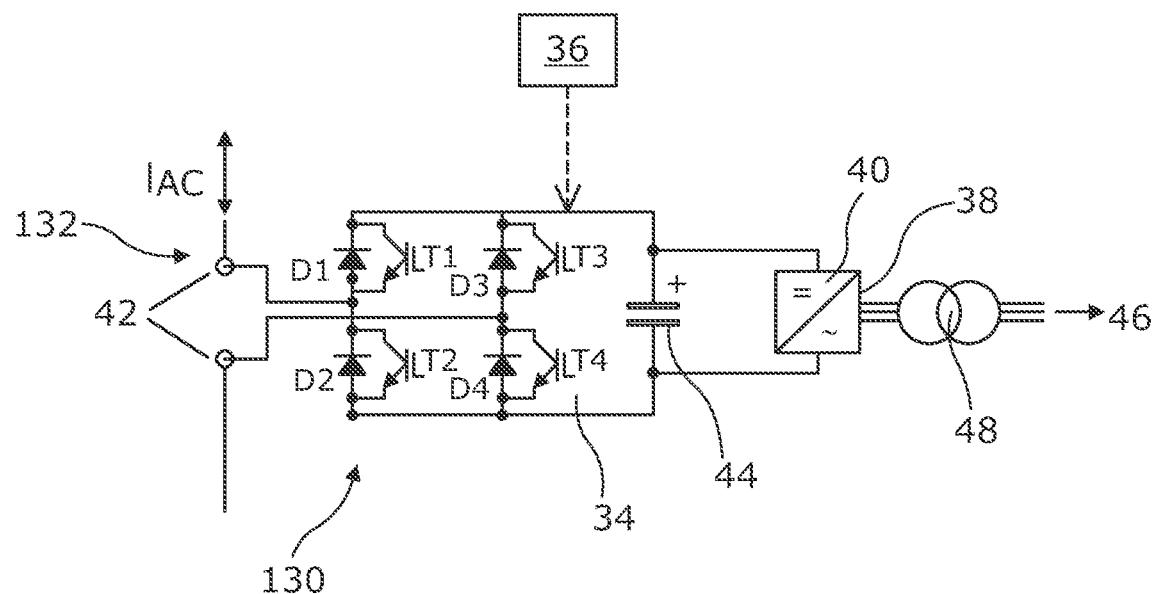
FIG. 3 shows schematically a power supply apparatus according to a second embodiment of the invention.

A power supply apparatus according to a second embodiment of the invention is shown In FIG. 3 and is designated generally by the reference numeral 130. The power supply apparatus 130 of FIG. 3 is similar in structure and operation to the power supply apparatus 30 of FIG. 1, and like features share the same reference numerals.

The power supply apparatus 130 of FIG. 3 differs from the power supply apparatus 30 of FIG. 1 in that, in the power supply apparatus 130 of FIG. 3, the plurality of switching elements includes two pairs of switching elements, and the pairs of switching elements are connected in parallel with the energy storage device 44 in a full-bridge arrangement to define a 4-quadrant bipolar module that can provide negative, zero or positive voltages and can conduct current in two directions. Also, in the power supply apparatus 130 of FIG. 3, the DC power transmission line 32 is replaced by an AC power transmission line 132 (e.g. a single-phase AC power transmission line) and so, in use, an alternating current flows through the AC power transmission line 132. Alternatively, in the power supply apparatus 130 of FIG. 3, the DC power transmission line 32 may be replaced by an electrode line for a bipolar HVDC power transmission scheme or any other DC power transmission line that carries a bidirectional current. As mentioned above, a bidirectional current flows in a power transmission line in one direction at a given time and in the opposite direction at a different time, but not in both directions at the same time.

The arrangement of the plurality of switching elements in this manner permits their switching to direct the bidirectional alternating current flowing in the AC power transmission line 132 to flow through the energy storage device 44 when the energy storage device 44 is switched into circuit with the input terminal. In the power supply module 134, the energy storage device 44 can charge up in both directions of current.

Optionally the IGBTs T1, T2, T3, T4 of the switching elements may be turned off during the storing of energy in the energy storage device 44. In this case energy can still be stored in the energy storage device by way of the current flowing in the AC power transmission line 132 being passively directed through the anti-parallel diodes D1, D2, D3, D4. This obviates the need for the control unit 36 to confirm the direction of flow of the alternating current in the AC power transmission line 132 in order to enable the proper storing of energy in the energy storage device 44.

Also optionally, when it is not required to store energy in the energy storage device 44, the switching elements may be controlled to alternate between two switching configurations, both of which results in the bypass of the energy storage device 44, in order to equalise thermal loading. In the embodiment shown the first switching configuration involves turning on the IGBTs T1 and T3 and turning off the IGBTs T2 and T4, while the second switching configuration involves turning on the IGBTs T2 and T4 and turning off the IGBTs T1 and T3.

In other embodiments of the invention, it is envisaged that the plurality of switching elements may be arranged in other ways to permit switching of the energy storage device into and out of circuit with the input terminals.

Figures 4A, 4B:
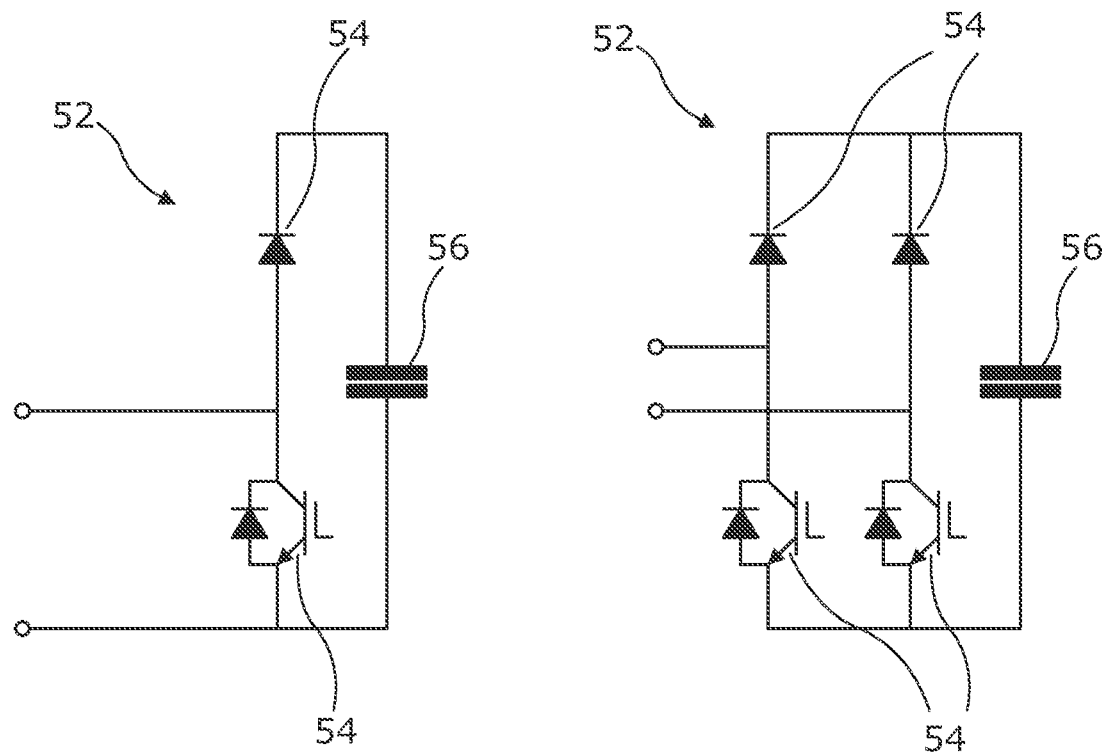
FIGS. 4A and 4B shows schematically respective power supply module variants.

In a variant of the power supply module 34 of FIG. 1, the arrangement of the plurality of switching elements 54 in the variant 52 is identical to the arrangement of the plurality of switching elements in the power supply module 34 except that the IGBT T1 is omitted. FIG. 4A shows this variant 52. This variant 52 is typically used in cases where there is no requirement for power to be exported back out of the input terminals, i.e. the flow of power is only ever from the input terminals to the output terminals.

In another variant of the power supply module 134 of FIG. 3, the arrangement of the plurality of switching elements in the variant is identical to the arrangement of the plurality of switching elements in the power supply module 134 except that one or more particular IGBTs may be omitted. This is possible in cases where the switching of the or each particular IGBT is not required for the power supply apparatus 130 to perform its function. For example, the power supply module 52 may be configured to omit IGBTs T1 and T3 so that the plurality of switching elements 54 includes first and second sets of series-connected current flow control elements connected in parallel with the energy storage device 56 in a full-bridge arrangement to define a 4-quadrant bipolar rationalised module that can provide negative, zero or positive voltages and can conduct current in two directions. FIG. 4B shows this variant. In this manner the plurality of switching elements 54 are arranged to selectively direct current through the energy storage device 56. This variant 52 is typically used in cases where there is no requirement for power to be exported back out of the input terminals, i.e. the flow of power is only ever from the input terminals to the output terminals.

It is also envisaged that, in further other embodiments of the invention, each IGBT may be replaced by a different type of active switching device, and/or each diode may be replaced by a different type of passive current check device that is capable of limiting current flow therethrough to only one direction.

It is further envisaged that, in still further other embodiments of the invention, the energy storage device may be replaced by a plurality of energy storage devices, and/or the capacitor may be replaced by another type of energy storage device configured to be capable of storing energy to provide a voltage thereacross and releasing energy.

Figure 5:
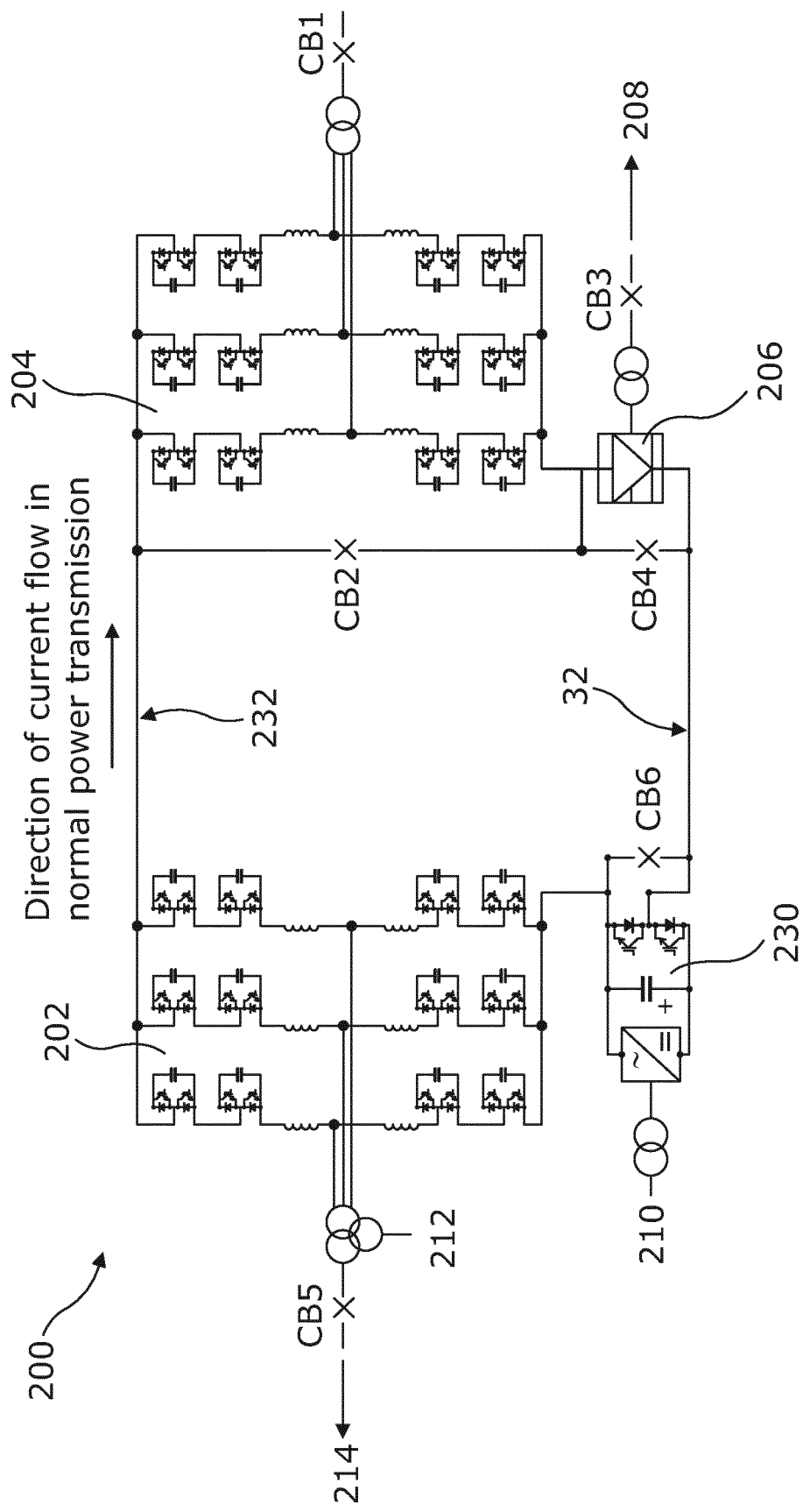
FIG. 5 shows schematically an electrical assembly according to a third embodiment of the invention.

An electrical assembly according to a third embodiment of the invention is shown In FIG. 5 and is designated generally by the reference numeral 200.

The electrical assembly 200 comprises first and second primary AC-DC converters 202, 204, first and second DC power transmission lines 232, 32, a first auxiliary device 230, and a second auxiliary device 206.

The first primary AC-DC converter 202 is an offshore converter, while the second primary AC-DC converter 204 is an onshore converter. It will be appreciated that the "offshore" and "onshore" configurations of the first and second primary AC-DC converters 202, 204 are merely chosen to help describe the working of the electrical assembly 200, and the first and second primary AC-DC converters 202, 204 may be configured differently from the respective "offshore" and "onshore" configurations.

Each primary AC-DC converter 202, 204 includes first and second DC terminals. In addition each primary AC-DC converter 202, 204 includes a plurality of AC terminals, each of which in use is connected to a respective phase of a respective multi-phase AC network. More particularly, each primary AC-DC converter 202, 204 includes a plurality of converter limbs.

Each converter limb extends between the first and second DC terminals, and includes a first limb portion that extends between the first DC terminal and the AC terminal, and a second limb portion which extends between the second DC terminal and the AC terminal.

Each limb portion includes a plurality of series-connected half-bridge modules to define a chain-link converter. In the specific embodiment shown, each limb portion module includes a pair of switching elements that are connected in parallel with a capacitor in a half-bridge arrangement to define a 2-quadrant unipolar module that can provide zero or positive voltages and can conduct current in two directions.

Each switching element constitutes an insulated gate bipolar transistor (IGBT), which is connected in parallel with an anti-parallel passive current check element in the form of a diode.

It is envisaged that, in other embodiments of the invention, the IGBT may be replaced by one or more other semiconductor switches, the diode may be replaced by another type of passive current check element that limits current flow to only one direction, and/or each capacitor may be replaced by another type of energy storage device that is capable of storing and releasing energy, e.g. a fuel cell or battery.

It will be appreciated that the topology of each primary AC-DC converter 202, 204 is merely chosen to help illustrate the operation of the invention, and that each primary AC-DC converter 202, 204 may be replaced by another converter with a different topology.

The first DC power transmission line 232 is operatively connected between the first DC terminals of the primary AC-DC converters 202, 204, and is normally at a first DC voltage. The second DC power transmission line 32 is operatively connected between the second DC terminals of the primary AC-DC converters, and is normally at a second DC voltage that is defined such that the first DC power transmission line 232 is positive with respect to the second DC power transmission line 32. In one example, when the first DC voltage is positive, the second DC power transmission line 32 may be at: a negative DC voltage or at a positive DC voltage that is lower in magnitude than the positive DC voltage of the first DC power transmission line 232. In another example, when the first DC voltage is negative, the second DC power transmission line 32 may be at a negative DC voltage that is higher in magnitude than the negative DC voltage of the first DC power transmission line 232.

The first auxiliary device 230 is in the form of a power supply apparatus, which in the embodiment shown is similar in structure and operation to the power supply apparatus 30 of FIG. 1. The first auxiliary device 230 is arranged such that its power supply module 34 is connected in series between the second DC terminal of the first primary AC-DC converter 202 and the second DC power transmission line 32.

The second auxiliary device 206 is in the form of a rectifier. The second auxiliary device 206 is arranged such that its DC side is connected in series between the second DC terminal of the second primary AC-DC converter 204 and the second DC power transmission line 32. In use, the AC side of the second auxiliary device 206 is connected via a transformer and a circuit breaker CB3 to an AC electrical source 208.

The electrical assembly 200 includes a circuit breaker CB5 connected at the AC side of the first primary AC-DC converter 202 and another circuit breaker CB1 connected at the AC side of the second primary AC-DC converter 204.

The electrical assembly 200 also includes a primary bypass current path connected in parallel with the second primary AC-DC converter 204 so as to be connected between the pair of DC power transmission lines 232, 32. The primary bypass current path includes a circuit breaker CB2 operable to selectively open and close the primary bypass current path.

The electrical assembly 200 further includes a respective secondary bypass current path connected across each auxiliary device 230, 206, each secondary bypass current path including a circuit breaker CB6, CB4 operable to selectively open and close the respective secondary bypass current path. This allows each auxiliary device 230, 206 to be bypassed when the first and second primary AC-DC converters 202, 204 are required to carry out their normal power transmission operation.

The operation of the primary AC-DC converters 202, 204 and the circuit breakers CB1, CB2, CB3, CB4, CB5, CB6 may be performed by a controller (not shown). More particularly, the controller is programmed to control the switching of the switching elements of the limb portion modules in order to operate each limb portion module to selectively provide a voltage source, and the controller is further programmed to selectively send an open or close command to each circuit breaker CB1, CB2, CB3, CB4, CB5, CB6 to open or close. The opening and closing of the circuit breakers CB1, CB2, CB3, CB4, CB5, CB6 take place during start-up and shut-down, but not during normal operation of the electrical assembly 200.

The configuration of the controller may vary. For example, the controller may include a global control system, at least one local control system, or a combination thereof. The global control system may be located remotely from each device, and may be configured to communicate with each device via communications links. The or each local control system may be located in the vicinity of at least one device. The global control system may be configured to communicate with at least one local control system via communications links.

An exemplary start-up sequence of the electrical assembly 200 is described as follows, with reference to FIG. 5.

When the electrical assembly 200 is operated to import and transmit power from an offshore power source (such as a wind farm) to an onshore power system (such as an AC power grid), power flow is normally from offshore to onshore. However, when re-starting the electrical assembly 200 after an offshore outage, there may be a requirement for power to flow in the opposite direction in order to provide auxiliary power to an auxiliary power supply (such as a battery) of the offshore converter 202 to initiate its start-up, where the auxiliary power supply is configured to power the controls and cooling system of the offshore converter 202. This requires the reversal of either the current or DC voltage of the DC power transmission lines 232, 32 in comparison to its direction during normal power transmission operation of the electrical assembly 200.

The power supply apparatus 230 may be rated to supply the required auxiliary power to the auxiliary power supply of the offshore converter 202 (in which case the auxiliary power supply represents the electrical load 46 to the output terminals 38 of the power supply apparatus 230). For example, the energy storage device 44 of the power supply apparatus 230 may be rated to have a DC voltage of 2000 V so that, when the second DC power transmission line 32 carries a current of 1500 A, 3 MW of auxiliary power can be supplied by the power supply apparatus 230 to the auxiliary power supply of the offshore converter 202. Such an amount of auxiliary power is sufficient to meet the typical power requirement to enable start up of the controls and cooling system of the offshore converter 202 such that the offshore converter 202 can subsequently take over the duty of providing the auxiliary power.

Following an offshore grid outage, the start-up sequence is initiated by closing the circuit breakers CB2 and CB3 and opening the circuit breakers CB1, CB4, CB5 and CB6 (which includes maintaining the open state of a given circuit breaker if it is already open). This connects the DC side of the second auxiliary device 206 into series circuit with the primary bypass current path and the second DC power transmission line 32, and connects the AC side of the second auxiliary device 206 to the associated AC electrical source 208. This thereby forms a freewheeling current path that includes the first DC power transmission line 232, the primary bypass current path, the second auxiliary device 206, the second DC power transmission line 32, the power supply apparatus 230, and the anti-parallel diodes of the limb portion modules of the first primary AC-DC converter 202.

The second auxiliary device 206 is then deblocked so that the second auxiliary device 206 is able to insert a DC voltage (which may be in the order of −2 kV) into the freewheeling current path. The insertion of the DC voltage into the freewheeling current path reverses the relative polarity between the pair of DC power transmission lines 232, 32. This results in the driving of a direct current to flow in the freewheeling current path by reversing the relative polarity between the pair of DC power transmission lines 232, 32. The direction of the driven direct current is the same as the current flowing in the DC power transmission lines 232, 32 during normal power transmission operation of the electrical assembly 200.

The flow of the driven direct current through the power supply apparatus 230 permits the storing of energy in its energy storage device 44 and the subsequent supply of power to its output terminals 38, which is connected to an auxiliary AC busbar 210 that is connected to the auxiliary power supply configured to power the controls and cooling system of the offshore converter 202.

On receipt of power from the auxiliary power supply, the cooling system starts up. Since power losses for the offshore converter 202 is low at this stage, the flow rate in the cooling system (which may be in the form of a plant) can be less than nominal but should be sufficient to allow the conductivity of the water to be checked and verified to be low enough for safe operation.

The first and second auxiliary devices 230, 206 are then blocked, isolated and bypassed by closing the circuit breakers CB4 and CB6 and opening the circuit breaker CB3. This will result in a temporary interruption (typically a few seconds) of power to the auxiliary power supply configured to power the cooling system of the offshore converter 202, which is of negligible consequence.

Thereafter the circuit breaker CB2 is opened and the circuit breaker CB1 is closed, before the offshore and onshore converters 202, 204 are started up. The DC voltages of the DC power transmission lines 232, 32 rise to around 80% of their normal values, with normal polarity. This then charges up the limb portion modules of the offshore converter 202 to around 40% of normal voltage, which is sufficient to start up the power supplies of their respective on-board controls.

The offshore and onshore converters 202, 204 are then deblocked to establish a full DC voltage of the DC power transmission lines 232, 32 and to create an AC voltage at the AC side of the offshore converter 202 to permit the supply of auxiliary power to the other AC auxiliary busbar(s) 212 on the offshore platform on which the offshore converter 202 is located. The cooling system then re-starts. Once the cooling system is fully operational and other safety checks have been made, the circuit breaker CB5 is closed to connect the offshore power source 214 to the offshore converter 202 so that either auxiliary power can be exported to the offshore power source (if required) or normal power transmission operation can commence.

In a first variant of the electrical assembly (not shown), the DC side of each auxiliary device may be connected in the opposite polarity, and the primary bypass current path is connected in parallel with the offshore converter. The start-up sequence of the first variant is similar to the electrical assembly 200 of FIG. 5 except that, instead of the relative polarity between the pair of DC power transmission lines, the direction of the current of the DC power transmission lines is reversed in comparison to its direction during normal power transmission operation.

In a second variant of the electrical assembly (not shown), the offshore converter is in the form of a diode bridge rectifier. The start-up sequence of the second variant is similar to the electrical assembly 200 of FIG. 5 except that, since the diode bridge rectifier cannot be used to provide auxiliary power, the power supply apparatus would become the sole power source for the offshore platform and would therefore need to continue supplying the auxiliary power to the auxiliary power supply after the start-up sequence is completed.

In further variants of the electrical assembly 200 (not shown), either or each of the onshore converter and second auxiliary device may take the form of a different type of converter capable of producing at least a partial negative DC voltage. For example, the different type of converter may be in the form of a Multilevel Modular Converter based on full-bridge limb portion modules (the structure of which is similar to the power supply module 34 shown in FIG. 2), an Alternate Arm Converter (the structure of which is similar to the offshore converter 202 with the addition of a respective director switch connected in series with the limb portion modules in each limb portion), or a hybrid Multilevel Modular Converter based on the combination of half-bridge and full-bridge modules in the converter limbs.

Furthermore the electrical assembly 200 may include a plurality of series-connected first auxiliary devices in place of the single first auxiliary device 230, in order to provide redundancy. Due to the autonomous control of each first auxiliary device, there is no way of synchronising the first auxiliary devices. Therefore, each first auxiliary device would need to be connected to a respective auxiliary AC busbar on the offshore platform, and provisions should be made to ensure that no two or more auxiliary AC bus bars are connected to each other.

It will be appreciated that numerical values associated with the operating parameters of the invention are merely selected to illustrate the working of the invention, and other numerical values may apply to the operating parameters of the invention depending on the requirement of the associated power application.

What we claim is:

1. A power supply apparatus for supplying power to an external electrical load, the power supply apparatus comprising:
    a power transmission line or cable through which an alternating or direct current may flow;
    a power supply module including an input terminal connected to the power transmission line or cable so that the power supply module is connected in series with the power transmission line or cable, the power supply module including a plurality of switching elements and at least one energy storage device, the at least one energy storage device storing energy to provide a voltage thereacross and releasing energy, the plurality of switching elements being arranged to permit switching of the at least one energy storage device in and out of circuit with the input terminal;
    a control unit programmed to control the plurality of switching elements to selectively switch the at least one energy storage device in the circuit with the input terminal to direct a current flowing in the power transmission line or cable to flow through each energy storage device so as to store energy in the at least one energy storage device to form a power source, wherein the control unit is configured to be powered by the power source;
    an output terminal for connection to the external electrical load; and
    a converter connected to the power supply module to operably couple the at least one energy storage device to the output terminal, the converter configured to draw power from the power source and supply the drawn power to the output terminal;
    first and second primary converters;
    a pair of DC power transmission links extending between and interconnecting DC sides of the first and second primary converters; and
    a first auxiliary device comprising the power supply apparatus, the first auxiliary device operably connected between the DC sides of the first and second primary converters such that the power transmission line or cable of the power supply apparatus extends between and interconnects the DC sides of the first and second primary converters,
    wherein the external electrical load is a power supply configured to power at least one component of the first primary converter, and one of the pair of DC power transmission links is the power transmission line or cable of the power supply apparatus, and
    wherein the converter is configured to regulate the power supplied to the output terminal so as to maintain the voltage across the at least one energy storage device within a target range to match the power drawn from the power source and the drawn power supplied to the output terminal.

2. The power supply apparatus according to claim 1, wherein the plurality of switching elements are arranged to be switchable to form a current path in the power supply module to direct the current flowing in the power transmission line or cable to bypass the at least one energy storage device.

3. The power supply apparatus according to claim 1 where the at least one energy storage device storing energy to provide a DC voltage thereacross, and the converter is or includes a DC-DC converter, a single-phase inverter or a multi-phase inverter.

4. The power supply apparatus according to claim 1, wherein the converter is configured to regulate a magnitude or a frequency of an output voltage or regulate an output current to regulate the power supplied to the output terminal so as to maintain the voltage across the at least one energy storage device within the target range.

5. The power supply apparatus according to claim 1, wherein the control unit is programmed to control the plurality of switching elements to control the switching of the at least one energy storage device and out of the circuit with the input terminal to regulate the storing of energy in the at least one energy storage device so as to maintain the voltage across the at least one energy storage device within the target range.

6. The power supply apparatus according to claim 1, wherein the plurality of switching elements are arranged to be switchable to direct a unidirectional or bidirectional current flowing in the power transmission line or cable to flow in a unidirectional direction through the at least one energy storage device when the at least one energy storage device is switched in the circuit with the input terminal.

7. The power supply apparatus according to claim 1 wherein the power supply module is configured so that:
    the plurality of switching elements includes a pair of switching elements and the pair of switching elements is connected in parallel with the at least one energy storage device in a half-bridge arrangement to define a 2-quadrant unipolar module that provides zero or positive voltages and conducts current in two directions; or
    the plurality of switching elements includes two pairs of switching elements and the pairs of switching elements are connected in parallel with the at least one energy storage device in a full-bridge arrangement to define a 4-quadrant bipolar module that provides negative, zero or positive voltages and conducts current in two directions; or
    the plurality of switching elements includes first and second sets of series-connected current flow control elements connected in parallel with the at least one energy storage device in a full-bridge arrangement to define a 2-quadrant or 4-quadrant bipolar rationalised module that provides negative, zero or positive voltages and conducts current in two directions or only one direction, preferably wherein each set of current flow control elements includes a series connection of an active switching device and a passive current check device arranged to selectively direct current through the at least one energy storage device.

8. An electrical assembly comprising: a power supply apparatus according to claim 1, wherein the external electrical load is connected to the output terminal of the power supply apparatus to permit the power supply apparatus to supply power to the external electrical load.

9. The electrical assembly according to claim 8, wherein the first primary converter is an offshore converter.

10. The electrical assembly according to claim 9, wherein the control unit of the power supply apparatus is configured to supply power to the external electrical load during a start-up of the first primary converter.

11. The electrical assembly according to claim 9, wherein the current is a first current, and wherein at least one of the primary converters is configured to selectively drive a second current to flow in a freewheeling current path that includes the pair of DC power transmission links and the power supply module.

12. The electrical assembly according to claim 11, wherein the voltage is a first voltage, and wherein the at least one of the primary converters is configured to insert a second voltage into the freewheeling current path so as to selectively drive the current to flow in the freewheeling current path by reversing a relative polarity between the pair of DC power transmission links or by reversing a direction of the second current flowing in the pair of DC power transmission links.

13. The electrical assembly according to claim 9, wherein the current is a first current, and further including a second auxiliary device connected between the DC sides of the first and second primary converters such that the second auxiliary device is operably connected to one of the pair of DC power transmission links, wherein the second auxiliary device is configured to selectively drive a second current to flow in a freewheeling current path that includes the pair of DC power transmission links and the power supply module.

14. The electrical assembly according to claim 13, wherein the voltage is a first voltage, and wherein the second auxiliary device is configured to insert a second voltage into the freewheeling current path so as to selectively drive the current to flow in the freewheeling current path by reversing a relative polarity between the pair of DC power transmission links or by reversing a direction of the second current flowing in the pair of DC power transmission links.

15. The electrical assembly according to claim 13 wherein the second auxiliary device is an auxiliary converter for connection to an electrical source, wherein the auxiliary converter is a rectifier.

16. The electrical assembly according to claim 11 wherein the freewheeling current path further includes one of the primary converters.

17. The electrical assembly according to claim 11, further including a primary bypass current path connected between the pair of DC power transmission links, the primary bypass current path including a circuit interruption device operable to selectively open and close the primary bypass current path, the freewheeling current path including the primary bypass current path in its closed state.

18. The electrical assembly according to claim 17, wherein the primary bypass current path is connected in parallel with either the first or second primary converter.

19. The electrical assembly according to claim 9, further including a respective secondary bypass current path connected across each auxiliary device, each secondary bypass current path including a circuit interruption device operable to selectively open and close the respective secondary bypass current path.

20. The electrical assembly according to claim 9, wherein the first primary converter comprises a diode rectifier.

21. The electrical assembly according to claim 8 including a plurality of power supply apparatuses, wherein each power supply apparatus is connected to a respective terminal of the external electrical load.

* * * * *